Patented Aug. 22, 1933

1,923,911

UNITED STATES PATENT OFFICE 1,923,911

PROCESS OF TREATING RUBBER AND THE IMPROVED AGE RESISTING RUBBER PRODUCED THEREBY

Hugh Mills Bunbury, Prestwich, and John Stanley Herbert Davies, Crumpsall, and William Johnson Smith Naunton, Prestwich, England, assignors to Imperial Chemical Industries Limited, a Corporation of Great Britain No Drawing. Application October 31, 1931, Serial No. 572,436, and in Great Britain November 22, 1930

6 Claims. (Cl. 18—50)

This invention relates to a novel process of producing age-resisting rubber of desirable properties and to the product of such processes.

Many substances have heretofore been used or suggested as preservatives of rubber and been found for one reason or another to be unsatisfactory in use. As examples of such compounds are certain hydroxy aromatic compounds, namely, certain phenols and naphthols. The presence of phenols or naphthols in a rubber mix generally retards the vulcanization or the compounds are apt to volatilize out of the rubber, which naturally does not obtain the benefits of their initial presence. Moreover, their employment is frequently attended with an objectionable discoloration of the rubber or objectionable odor. By the present invention these defects are all avoided.

According to our invention there is incorporated in rubber (and by rubber we wish to include rubber-like substances and synthetic rubber) at a suitable stage in the manufacture thereof, a boric acid ester of a naphthol. This results in increasing the resistance of the rubber and rubber-like substances to deterioration due to ageing. In carrying the invention into practical effect, we prefer to incorporate the boric acid ester of a naphthol in the rubber at the time the "mix" is prepared, that is, prior to vulcanization. The proportion used is preferably about 1% of the whole mix, but more or less may be used if so desired.

Our invention is illustrated but not limited by the following example, in which the parts are by weight:

Example

A rubber mix is made up as follows:

| | Parts |
|---|---|
| Pale crepe | 100 |
| Zinc oxide | 10 |
| Chalk | 100 |
| Sulphur | 3.5 |
| Diphenylguanidine | 0.5 |

To a portion A, is added 2 quarts of tri-a-naphthyl borate in accordance with the invention. To another portion B, which serves for comparison, nothing is added. The tri-a-naphthyl borate is made by any well-known process of forming a boric acid ester of alpha naphthol.

Not only the tri-a-naphthyl borate may be employed, but the boric acid ester of beta naphthol may be employed according to the procedure set forth in the example.

The two preparations are cured for 45 minutes at 141°. They are then "aged" in a Pierer bomb for 2 days at 70° under an oxygen pressure of 300 lbs. per square inch.

The material A then possesses a tensile strength at break of 111 kilog. per sq. cm. and an elongation at break of 540% and it is not appreciably discoloured. The material B is completely degenerated.

The products obtained by the process of our invention are very resistant to ageing and do not suffer from discoloration. Moreover, our anti-agers do not volatilize readily and therefore no losses by volatilization take place during the milling of the mix or subsequent treatment, and the rubber, therefore, obtains the full benefit of the anti-ager.

Since many embodiments of this invention, differing widely in one or more respects, may be made without departing from the spirit of our invention, it is to be understood that we do not limit ourselves to the foregoing examples or description except as indicated in the following claims:

We claim:

1. The process of increasing the resistance of vulcanized rubber and the like to deterioration and discoloration due to ageing which comprises incorporating with the rubber or rubber-like substances a boric acid ester of a naphthol.

2. The process of increasing the resistance of vulcanized rubber and the like to deterioration and discoloration due to ageing which comprises incorporating with the rubber or rubber-like substances tri-a-naphthyl borate.

3. The process of increasing the resistance of vulcanized rubber and the like to deterioration and discoloration due to ageing which comprises incorporating with the rubber or rubber-like substances tri-b-naphthyl borate.

4. Vulcanized rubber or rubber-like substances produced by the process set forth in claim 1.

5. Vulcanized rubber or rubber-like substances produced by the process set forth in claim 2.

6. Vulcanized rubber or rubber-like substances produced by the process set forth in claim 3.

HUGH MILLS BUNBURY.
JOHN STANLEY HERBERT DAVIES.
WILLIAM JOHNSON SMITH NAUNTON.